United States Patent
Kato et al.

[11] Patent Number: 6,093,366
[45] Date of Patent: Jul. 25, 2000

[54] METHOD OF MANUFACTURING CERAMIC SINTERED BODIES

[75] Inventors: Masahiro Kato, Kanagawa-ken; Yasuhiro Goto, Tokyo; Takayuki Fukasawa, Kawasaki; Toshiaki Mizutani, Yokohama, all of Japan

[73] Assignee: Kabushiki Kaisha Toshiba, Kawasaki, Japan

[21] Appl. No.: 09/186,143

[22] Filed: Nov. 5, 1998

[30] Foreign Application Priority Data

Nov. 6, 1997 [JP] Japan ................................. 9-304419

[51] Int. Cl.[7] ............................ C04B 33/32; C04B 35/65
[52] U.S. Cl. .......................... 264/681; 264/646; 264/648; 501/102; 501/103; 501/104; 501/105; 501/117; 501/118; 501/121; 501/123; 501/126; 501/127; 501/128; 501/132; 501/154
[58] Field of Search ..................... 264/648, 681, 264/646; 501/102, 103, 104, 105, 117, 118, 121, 123, 126, 127, 128, 132, 154

[56] References Cited

U.S. PATENT DOCUMENTS

| 2,741,822 | 4/1956 | Udy | 264/648 |
| 5,928,979 | 7/1999 | Inuzuka et al. | 264/648 |

FOREIGN PATENT DOCUMENTS

| 60-54272 | 11/1985 | Japan | 264/648 |
| 8-26815 | 1/1996 | Japan. | |

OTHER PUBLICATIONS

Suxing Wu, et al. "Reaction Bonding and Mechanical Properties of Mullite/Silicon Carbide Composites", J. Am. Ceram. Soc., vol. 77 No. 11, Nov. 1994, pp. 2898–2904.

*Primary Examiner*—James Derrington
*Attorney, Agent, or Firm*—Oblon, Spivak, McClelland, Maier & Neustadt, P.C.

[57] ABSTRACT

The present invention provides a ceramic sintered body excellent in oxidation resistance under high temperatures and markedly superior to the conventional ceramic sintered body in the mechanical strength over a wide temperature range of between room temperature and 1,500° C. The ceramic sintered body of the present invention comprises at least one ceramic crystal grain selected from the group consisting essentially of a monosilicate represented by the general formula $RE_2SiO_5$, where RE denotes a IIIa group element including yttrium, and a disilicate represented by the general formula $RE_2Si_2O_7$, where RE denotes a IIIa group element including yttrium, and at least one additional element selected from the group consisting of Al, Cr, Hf, Nb, Zr, Ti, V, Ta, Ca and Mg which is segregated in the boundaries of the ceramic crystal grains in an amount of 0.1 to 15% by weight of the sintered body in terms of the oxide thereof.

15 Claims, 1 Drawing Sheet

METHOD OF MANUFACTURING CERAMIC SINTERED BODIES

BACKGROUND OF THE INVENTION

The present invention relates to a ceramic sintered body and a method of manufacturing the same, particularly, to a ceramic sintered body suitable for use in aircraft and space industries, gas turbines for power generation, gas turbines for automobiles, high temperature gas filters, etc., and a method of manufacturing the same.

A ceramic sintered body, which is superior to a metallic material in mechanical strength, heat resistance and wear resistance and is low in specific gravity, attracts attentions as a heat resistant construction material exposed to high temperatures. Among the various ceramic sintered bodies, oxide ceramic sintered bodies such as alumina, zirconia and magnesia and non-oxide ceramic sintered bodies such as carbide ceramic material like silicon carbide, nitride ceramic material like silicon nitride and boride ceramic material are under study for use as a heat resistant construction material.

The mechanical strength of the oxide ceramic sintered body, which is stable under an oxidizing atmosphere of room temperature, is rapidly lowered under high temperatures, making it difficult to use the oxide ceramic sintered body as a construction material exposed to high temperatures.

On the other hand, oxidation or decomposition tends to take place easily in the non-oxide ceramic sintered bodies such as the sintered bodies of the carbide ceramic material, the nitride ceramic material, and the boride ceramic material when these ceramic sintered bodies are exposed to an oxidizing atmosphere of high temperatures, leading to deterioration in the mechanical strength of the sintered body.

Japanese Patent Disclosure (KOKAI) No. 8-26815 discloses a rare earth-based composite oxide, comprising at least one ceramic crystal grain selected from the group consisting of a monosilicate represented by the general formula $RE_2SiO_5$, where RE denotes a IIIa group element, and a disilicate represented by the general formula $RE_2Si_2O_7$, where RE denotes a IIIa group element, and a complex oxide crystal grain represented by a general formula $RE_xM_yO_z$, where RE denotes a IIIa group element, and M denotes at least one element selected from the group consisting of Al, Cr, Hf, Nb, Zr, Ti, V and Ta.

In the rare earth-based composite oxide disclosed in JP '815, the composite oxide represented by the general formula $RE_xM_yO_z$ is dispersed in the form of crystal grains within the crystal grains of the monosilicate and/or disilicate. Since any of these crystal grains is relatively large, the mechanical properties of the composite oxide are markedly deteriorated under high temperatures of 1,000 to 1,500° C.

BRIEF SUMMARY OF THE INVENTION

An object of the present invention is to provide a ceramic sintered body excellent in oxidation resistance under high temperatures and exhibiting a mechanical strength markedly higher than that of the conventional ceramic sintered body under a wide temperature range of between room temperature and 1,500° C.

Another object is to provide a method of manufacturing a ceramic sintered body excellent in oxidation resistance under high temperatures and exhibiting a mechanical strength markedly higher than that of the conventional ceramic sintered body under a wide temperature range of between room temperature and 1,500° C., the method being capable of suppressing the shrinkage in the reaction sintering process at 10% or less.

According to a first aspect of the present invention, there is provided a ceramic sintered body, comprising at least one ceramic crystal grain selected from the group consisting essentially of a monosilicate represented by the general formula $RE_2SiO_5$, where RE denotes a IIIa group element including yttrium, and a disilicate represented by the general formula $RE_2Si_2O_7$, where RE denotes a IIIa group element including yttrium, and at least one additional element selected from the group consisting of Al, Cr, Hf, Nb, Zr, Ti, V, Ta, Ca and Mg which is segregated in the boundaries of the ceramic crystal grains in an amount of 0.1 to 15% by weight of the sintered body in terms of the oxide thereof.

According to a second aspect of the present invention, there is provided a method of manufacturing a ceramic sintered body, comprising the steps of:

preparing a mixed powder containing a Si powder, a powder of an oxide of a IIIa group element including yttrium, a powder of an oxide of at least one additional element selected from the group consisting of Al, Cr, Hf, Nb, Zr, Ti, V, Ta, Ca and Mg, the oxide powder of the additional element having an average particle diameter of 1.0 μm or less and being added to allow the manufactured ceramic sintered body to contain the oxide powder of the additional element in an amount of 0.1 to 15% by weight;

molding the powder mixture to prepare a molding; and sintering the molding in an oxidizing atmosphere.

Further, according to a third aspect of the present invention, there is provided a method of manufacturing a ceramic sintered body, comprising the steps of:

preparing a mixed powder containing a IIIa group element including yttrium, a $SiO_2$ powder, and a powder of an oxide of at least one additional element selected from the group consisting of Al, Cr, Hf, Nb, Zr, Ti, V, Ta, Ca and Mg, the oxide powder of the additional element having an average particle diameter of 1.0 μm or less and being added to allow the manufactured ceramic sintered body to contain the oxide powder of the additional element in an amount of 0.1 to 15% by weight;

molding the powder mixture to prepare a molding; and sintering the molding in an oxidizing atmosphere.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Let us describe the ceramic sintered body of the present invention more in detail.

Specifically, the ceramic sintered body of the present invention consists essentially of at least one ceramic crystal grain selected from the group consisting of a monosilicate represented by the general formula $RE_2SiO_5$, where RE denotes a rare earth element (a IIIa group element) including yttrium, and a disilicate represented by the general formula $RE_2Si_2O_7$, where RE denotes a IIIa group element including yttrium. In the ceramic sintered body of the present invention, at least one additional element selected from the group consisting of Al, Cr, Hf, Nb, Zr, Ti, V, Ta, Ca and Mg is segregated at the boundaries between the crystal grains in an amount of 0.1 to 15% by weight in terms of the oxide thereof.

Figure 1:
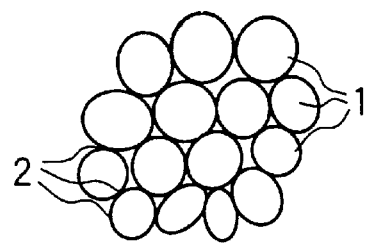
FIG. 1 schematically shows the fine structure of a ceramic sintered body obtained in the present invention, which is observed with a microscope.

As seen from FIG. 1, which schematically shows the fine structure observed with a microscope, the ceramic sintered body of the present invention consists essentially of at least one ceramic crystal grains 1 selected from the group consisting of a monosilicate and a disilicate. Also, an oxide of at least one additional element selected from the group consisting of Al, Cr, Hf, Nb, Zr, Ti, V, Ta, Ca and Mg is segregated to form a segregation layer 2 at the boundaries between the crystal grains 1 in an amount of 0.1 to 15% by weight in terms of the oxide thereof.

The ceramic sintered body of the present invention consists essentially of ceramic crystal grains. This indicates that the ceramic sintered body of the present invention is substantially free from crystal grains other than the monosilicate crystal grains, disilicate crystal grains and a mixture thereof and having a grain diameter of at least 100 nm, which can be microscopically observed.

It is desirable for the ceramic crystal grains to have an average grain diameter of 1.1 to 20 μm, preferably 1 to 20 μm. Also, the boundary of the crystal grains should desirably have a thickness of 0.1 to 100 nm.

In the ceramic sintered body of the present invention, an oxide of at least one additional element (M) is segregated at the boundaries of the ceramic crystal grains. To be more specific, at least one compound consisting of the additional element M, at least one of RE and Si, and 0, e.g., $RE_xM_yO_z$ or $M_aSi_bO_c$, where $0.5 \leq x \leq 5$, $0.5 \leq y \leq 5$, $1 \leq z \leq 20$, $0.5 \leq a \leq 5$, $0.5 \leq b \leq 5$, and $1 \leq c \leq 10$, which does not assume a crystal grain having a diameter larger than 100 nm, is segregated at the boundaries between the crystal grains.

The amount of the additional element M, e.g., Al, contained in the segregation layer is defined to fall within a range of between 0.1 and 15% by weight of the sintered body in terms of the oxide of the additional element M. If the amount of the additional element M is less than 0.1% by weight of the sintered body in terms of the oxide thereof, a sufficiently large amount of the segregation layer is not formed at the boundaries between the ceramic crystal grains, resulting in failure to increase sufficiently the density of the manufactured ceramic sintered body. It follows that it is difficult to obtain a ceramic sintered body having a high oxidation resistance and mechanical strength under high temperatures. On the other hand, if the amount of the additional element M such as Al exceeds 15% by weight of the sintered body in terms of the oxide thereof, crystal grains having a grain diameter of 100 nm or more, which can be microscopically observed, are formed together with the ceramic crystal grains, with the result that the properties of the particular crystal grains are rendered sensible so as to impair the high temperature characteristics inherent in the monosilicate and disilicate. The amount of the additional element M such as Al should preferably be 0.5 to 10% by weight, more preferably 1 to 5% by weight, of the sintered body in terms of the oxide thereof.

The ceramic sintered body of the present invention described above consists essentially of at least one ceramic crystal grain selected from the group consisting of a monosilicate represented by the general formula $RE_2SiO_5$ and a disilicate represented by the general formula $RE_2Si_2O_7$, and at least one of an additional element selected from the group consisting of Al, Cr, Hf, Nb, Zr, Ti, V, Ta, Ca and Mg, which is segregated at the boundaries of the crystal grains in an amount of 0.1 to 15% by weight of the sintered body in terms of the oxide of the additional element.

Since the ceramic sintered body consists essentially of at least one ceramic crystal grain selected from the monosilicate and disilicate, the sintered body exhibits the characteristics of the ceramic crystal grain i.e., exhibits a high oxidation resistance at high temperatures. In addition, the ceramic sintered body of the present invention is markedly superior to conventional ceramic sintered body in the mechanical strength under a wide temperature range of between room temperature and 1,500° C.

It should also be noted that an additional element M such as Al is segregated at the boundaries between the ceramic crystal grains in an amount of 0.1 to 15% by weight of the sintered body, with the result that the density of the sintered body can be increased without impairing the high temperature characteristics inherent in the ceramic crystal grains. It follows that the mechanical strength of the ceramic sintered body can be further improved.

Further, the average grain diameter of the ceramic crystal grains is as small as 0.1 to 20 μm so as to allow the ceramic sintered body of the present invention to exhibit a high oxidation resistance under high temperatures and a further improved mechanical strength over a wide temperature range of between room temperature and 1,500° C.

Let us describe a method of manufacturing a ceramic sintered body of the present invention.

In the first step, prepared are raw materials consisting of a Si powder, an oxide powder of a IIIa group element including yttrium, and an oxide powder of at least one additional element M selected from the group consisting of Al, Cr, Hf, Nb, Zr, Ti, V, Ta, Ca and Mg. The amount of the additional element M is controlled to fall within a range of between 0.1 and 15% by weight of the manufactured ceramic sintered body. These raw materials are mixed in a mixer such as a ball mill to prepare a mixed powder.

It is desirable for the Si powder and the oxide powder of the IIIa group element including yttrium to have an average particle diameter of 1.0 to 50 μm and 0.1 to 50 μm, respectively. If the particle diameters of the Si powder and the oxide powder of the IIIa group element including yttrium exceed the upper limits of 50 μm noted above, the reaction is retarded so as to lower the mechanical strength of the manufactured ceramic sintered body. If the particle diameter of the Si powder is less than the lower limit noted above, however, a native oxide film tends to be formed on the surface.

Among the additional elements M, Al and Zr are particularly preferred for increasing the density of the manufactured ceramic sintered body. If the amount of the raw material oxide of the additional element M is less than 0.1% by weight of the manufactured ceramic sintered body, a sufficiently large amount of the segregation layer is not formed at the boundaries between the ceramic crystal grains, resulting in failure to increase sufficiently the density of the manufactured ceramic sintered body. It follows that it is difficult to obtain a ceramic sintered body exhibiting a high oxidation resistance and mechanical strength under high temperatures. On the other hand, if the amount of the raw material oxide of the additional element M exceeds 15% by weight of the manufactured ceramic sintered body, crystal grains other than the ceramic crystal grains having a diameter of 100 nm or more, which can be microscopically observed, are formed. As a result, the properties of the particular crystal grains are made sensible so as to impair the characteristics of the monosilicate and disilicate. The amount of the raw material oxide of the additional element M should preferably be 0.5 to 10% by weight, more preferably 1 to 5% by weight, of the manufactured ceramic sintered body.

If the average particle diameter of the raw material oxide powder of the additional element M exceeds 1.0 $\mu$m, crystal grains other than the ceramic crystal grains and having a particle diameter of 100 nm or more, which can be microscopically observed, are formed in the sintering step of the molding, making it difficult to obtain a ceramic sintered body exhibiting the characteristics inherent in the monosilicate and disilicate. The average particle diameter of the raw material oxide powder of the additional element M should preferably be 0.01 to 0.5 $\mu$m, more preferably 0.05 to 0.3 $\mu$m.

The mixed powder should desirably contain an additional raw material of $SiO_2$ powder. The $SiO_2$ powder should desirably have an average particle diameter of 0.1 to 5.0 $\mu$m. If the average particle diameter of the $SiO_2$ powder exceeds 5.0 $\mu$m, the reaction is retarded so as to lower the mechanical strength of the resultant sintered body. On the other hand, if the average particle diameter of the $SiO_2$ powder is less than 0.1 $\mu$m, the powder is too fine to handle the powder easily.

The amount of the $SiO_2$ powder should desirably be determined in view of the amount of the Si powder to provide a $Si/SiO_2$ molar ratio of 0.1 to 20. If the $Si/SiO_2$ molar ratio fails to fall within the range noted above, it is difficult to suppress the shrinkage in the sintering step at 10% or less. More preferably, the $Si/SiO_2$ molar ratio should fall within a range of between 2.0 and 10.

In the next step, the mixed raw material powder is loaded in a mold so as to be molded under a uniaxial pressure of 30 to 200 MPa, followed by sintering the resultant molding under an oxidizing atmosphere such as air. As a result, obtained is a ceramic sintered body consisting essentially of at least one ceramic crystal grain selected from the group consisting of a monosilicate represented by the general formula $RE_2SiO_5$ and a disilicate represented by the general formula $RE_2Si_2O_7$, and at least one additional element M selected from the group consisting of Al, Cr, Hf, Nb, Zr, Ti, V, Ta, Ca and Mg, which is segregated at the boundaries between the crystal grains in an amount of 0.1 to 15% by weight of the manufactured sintered body in terms of the oxide of the additional element M.

The monosilicate ($RE_2SiO_5$) used in the present invention can be prepared by mixing an $RE_2O_3$, i.e., an oxide of the IIIa group element including yttrium and Si such that the molar ratio of $RE_2O_3$:$SiO_2$ is 1:1. On the other hand, the disilicate ($RE_2Si_2O_7$) used in the present invention can be prepared by mixing an $RE_2O_3$, i.e., an oxide of the IIIa group element including yttrium and Si such that the molar ratio of $RE_2O_3$:$SiO_2$ is 1:2.

The sintering temperature should be 1,100 to 1,850° C., preferably 1,200 to 1,750° C., and more preferably 1,400 to 1,650° C.

In the method of the present invention, Si contained in the molding is oxidized in the initial stage of the reaction to form $SiO_2$. Then, when $SiO_2$ reacts with an $RE_2O_3$, i.e., an oxide of the IIIa group element including yttrium, an oxide of at least one of the additional element M selected from the group consisting of Al, Cr, Hf, Nb, Zr, Ti, V, Ta, Ca and Ma forms a liquid phase so as to increase the density of the sintered body consisting essentially of at least one of fine ceramic crystal grains, having a diameter of 0.1 to 20 $\mu$m, selected from the monosilicate and disilicate.

As described previously, an oxide powder of at least one additional element M having an average particle diameter of 10 $\mu$m or less is mixed in the raw material powder in an amount of 0.1 to 15% by weight of the manufactured ceramic sintered body. The particular additional element M is segregated in the sintering step in the form of at least one of the compounds of, for example, $RE_xM_yO_z$ and $M_aSi_bO_c$ at the boundaries between the ceramic crystal grains. Where at least one of the compounds of $RE_xM_yO_z$ and $M_aSi_bO_c$ is segregated at the boundaries between the ceramic crystal grains, the characteristics of the sintered body are not deteriorated. However, if the particles of the particular compounds are so large as to be dispersed in the form of crystal grains, the characteristics of the sintered body at high temperatures are deteriorated.

As described above, the method of the present invention makes it possible to manufacture a ceramic sintered body consisting essentially of at least one kind of ceramic crystal grains selected from the monosilicate and disilicate, having a dense texture, excellent in oxidation resistance under high temperatures, and exhibiting a mechanical strength markedly higher than that of the conventional ceramic sintered body over a wide temperature range of between room temperature and 1,500° C.

It should also be noted that a volume expansion takes place when Si contained in the molding is oxidized to form $SiO_2$ in the initial stage of the reaction so as to offset the volume shrinkage which takes place during the reaction between $SiO_2$ and $RE_2O_3$ and in the sintering step. As a result, the shrinkage in the reaction-sintering step is suppressed at 10% or less in the manufacture of the ceramic sintered body of the present invention.

Particularly, where a $SiO_2$ powder is added such that the $Si/SiO_2$ molar ratio is 0.1 to 20 in addition to the Si powder, the $RE_2O_3$ powder and the oxide powder of the additional element M, the metal Si scarcely remains in the ceramic sintered body, making it possible to manufacture a ceramic sintered body in which the shrinkage in the reaction-sintering step is suppressed to a level much lower than 10%.

Further, the sintering can be carried out at low temperatures, e.g., 1,400 to 1,650° C., by adding an oxide of at least one element.

Let us describe another method of the present invention for manufacturing a ceramic sintered body.

In the first step, prepared are raw materials consisting of a powder of a IIIa group element including yttrium, a $SiO_2$ powder, and an oxide powder of at least one additional element M selected from the group consisting of Al, Cr, Hf, Nb, Zr, Ti, V, Ta, Ca and Mg. The amount of the additional element M is controlled to fall within a range of between 0.1 and 15% by weight of the manufactured ceramic sintered body. These raw materials are mixed in a mixer such as a ball mill to prepare a mixed powder.

It is desirable for the IIIa group element including yttrium powder and the $SiO_2$ powder to have an average particle diameters of 1.0 to 50 $\mu$m and 0.1 to 5.0 $\mu$m, respectively. If the average diameters of the IIIa group element powder and the $SiO_2$ powder exceed the upper limits noted above, the reaction is retarded so as to decrease the mechanical strength of the sintered body. On the other hand, if the average particle diameter of the IIIa group element powder is smaller than the lower limit noted above, a native oxide film tends to be formed on the surface of the powder particle.

Among the additional elements M noted above, it is particularly desirable to use Al and Zr because Al and Zr are effective for increasing the density of the ceramic sintered body.

The reason for defining the amount of the oxide powder of the additional element M is as already described in conjunction with the method described previously. Preferably, the amount of the oxide powder of the additional element M should be 0.5 to 10% by weight, more preferably 1 to 5% by weight, based on the manufactured ceramic sintered body.

The average particle diameter of the oxide powder of the additional element M should be 1.0 $\mu$m or less. The reason for the definition is as already described in conjunction with the method described previously. Preferably, the average particle diameter of the oxide powder of the additional element M should be 0.01 to 0.5 $\mu$m, more preferably 0.05 to 0.3 $\mu$m.

It is desirable for the mixed powder to contain an additional component of an $RE_2O_3$ powder, i.e., an oxide powder of the IIIa group element. The $RE_2O_3$ powder should desirably have an average particle diameter of 0.1 to 5.0 $\mu$m. If the average particle diameter of the $RE_2O_3$ powder exceeds 5.0 $\mu$m, the reaction is retarded so as to decrease the mechanical strength of the sintered body. On the other hand, if the average particle diameter of the $RE_2O_3$ powder is less than 0.1 $\mu$m, the powder is too fine to handle the powder easily.

It is desirable to add the $RE_2O_3$ powder to the mixed powder containing the RE powder, i.e., the IIIa group element including yttrium powder, such that the molar ratio of $RE/RE_2O_3$ is 0.1 to 15. If the $RE/RE_2O_3$ molar ratio fails fall within the range noted above, it is difficult to suppress the shrinkage in the sintering step to 10% or less. Preferably, the $RE/RE_2O_3$ molar ratio should be 0.5 to 10.

The mixed powder is loaded in a mold so as to be molded under a uniaxial pressure of 30 to 200 MPa.

In the next step, the resultant molding is sintered under an oxidizing atmosphere such as air so as to manufacture a ceramic sintered body consisting essentially of at least one ceramic crystal grain selected from the group consisting of the monosilicate represented by the general formula $RE_2SiO_5$ and the disilicate represented by the general formula $RE_2Si_2O_7$ and at least one additional element selected from the group consisting of Al, Cr, Hf, Nb, Zr, Ti, V, Ta, Ca and Mg which is segregated at the boundaries between the ceramic crystal grains in an amount of 0.1 to 15% by weight of the manufactured sintered body in terms of the oxide of the additional element.

The monosilicate ($RE_2SiO_5$) used in the present invention can be prepared by mixing a IIIa group element including yttrium (RE) and $SiO_2$ such that the molar ratio of $RE_2O_3:SiO_2$ is 1:1. On the other hand, the disilicate ($RE_2Si_2O_7$) used in the present invention can be prepared by mixing a IIIa group element including yttrium (RE) and $SiO_2$ such that the molar ratio of $RE_2O_3:SiO_2$ is 1:2.

The sintering temperature should be 1,100 to 1,850° C., preferably 1,200 to 1,750° C., more preferably 1,400 to 1,650° C.

As described above, in the method of the present invention, the IIIa group element including yttrium (RE) contained in the molding is oxidized in the initial stage of the reaction so as to form an $RE_2O_3$, i.e., an oxide of the IIIa group element including yttrium. When the $RE_2O_3$ reacts with $SiO_2$, an oxide of the additional element M selected from the group consisting of Al, Cr, Hf, Nb, Zr, Ti, V, Ta, Ca and Mg forms a liquid phase so as to increase the density of the sintered body consisting essentially of at least one fine ceramic crystal grain, having a diameter of 0.1 to 20 $\mu$m, selected from the group consisting of the monosilicate and disilicate.

As described previously, an oxide powder of at least one additional element M having an average particle diameter of 10 $\mu$m or less is mixed in the raw material powder in an amount of 0.1 to 15% by weight of the manufactured ceramic sintered body. The particular additional element M is segregated in the sintering step in the form of at least one of the compounds of, for example, $RE_xM_yO_z$ and $M_aSi_bO_c$ at the boundaries between the ceramic crystal grains. Where at least one of the compounds of $RE_xM_yO_z$ and $M_aSi_bO_c$ is segregated at the boundaries between the ceramic crystal grains, the characteristics of the sintered body are not deteriorated. However, if the particles of the particular compounds are so large as to be dispersed in the form of crystal grains, the characteristics of the sintered body at high temperatures are deteriorated.

As described above, the method of the present invention makes it possible to manufacture a ceramic sintered body consisting essentially of at least one kind of ceramic crystal grains selected from the monosilicate and disilicate, having a dense texture, excellent in oxidation resistance under high temperatures, and exhibiting a mechanical strength markedly higher than that of the conventional ceramic sintered body over a wide temperature range of between room temperature and 1,500° C.

It should also be noted that a volume expansion takes place when the IIIa group element including yttrium (RE) contained in the molding is oxidized to form an $RE_2O_3$, i.e., an oxide of the IIIa group element including yttrium so as to offset the volume shrinkage taking place during the reaction between $RE_2O_3$ and $SiO_2$ and in the sintering step. As a result, the shrinkage in the reaction-sintering step can be suppressed to 10% or less in the manufacture of the ceramic sintered body of the present invention.

Particularly, where an $RE_2O_3$, i.e., an oxide powder of a IIIa group element including yttrium is added such that the molar ratio of the IIIa group element including yttrium (RE) to the $RE_2O_3$ is 0.1 to 15 in addition to the powder of the RE, the $SiO_2$ powder, and the oxide powder of the additional element M, the RE scarcely remains in the ceramic sintered body, making it possible to manufacture a ceramic sintered body in which the shrinkage in the reaction-sintering step is suppressed to a level much lower than 10%.

Further, the sintering can be carried out at low temperatures, e.g., 1,400 to 1,650° C., by adding an oxide of at least one element.

Let us describe preferred Examples of the present invention.

EXAMPLE 1-1

In the first step, prepared was a raw material powder containing 0.9 mol % of a Si powder having an average particle diameter of 5 $\mu$m, 0.1 mol % of a $SiO_2$ powder having an average particle diameter of 0.8 $\mu$m, 1.0 mol % of $Y_2O_3$ powder having an average particle diameter of 1.3 $\mu$m, and an $Al_2O_3$ powder having an average particle diameter of 0.3 μm. The amount of the $Al_2O_3$ powder was 3% by weight based on the sum of the Si powder, the $SiO_2$ powder and the $Y_2O_3$ powder. The raw material powder was mixed using nylon balls in the presence of acetone used as a dispersion medium, followed by drying the mixture using a rotary evaporator so as to prepare a mixed powder. Then, the mixed powder was subjected to a cold press molding under a pressure of 200 MPa so as to obtain a molding. Further, the molding was left to stand within an annular furnace at 1,600° C. for 2 hours under the air atmosphere so as to obtain a monosilicate sintered body represented by $Y_2SiO_5$.

EXAMPLE 1-2

A monosilicate sintered body represented by $Y_2SiO_5$ was obtained as in Example 1-1, except that the raw material powder contained 0.8 mol % of a Si powder having an average particle diameter of 5.0 μm, 0.2 mol % of a $SiO_2$ powder having an average particle diameter of 0.8 μm, 1.0 mol % of $Y_2O_3$ powder having an average particle diameter of 1.3 μm, and an $Al_2O_3$ powder having an average particle diameter of 0.3 μm. The amount of the $Al_2O_3$ powder was 3% by weight based on the sum of the Si powder, the $SiO_2$ powder and the $Y_2O_3$ powder.

EXAMPLE 1-3

A monosilicate sintered body represented by $Y_2SiO_5$ was obtained as in Example 1-1, except that the raw material powder contained 0.7 mol % of a Si powder having an average particle diameter of 5.0 μm, 0.3 mol % of a $SiO_2$ powder having an average particle diameter of 0.8 μm, 1.0 mol % of $Y_2O_3$ powder having an average particle diameter of 1.3 μm, and an $Al_2O_3$ powder having an average particle diameter of 0.3 μm. The amount of the $Al_2O_3$ powder was 3% by weight based on the sum of the Si powder, the $SiO_2$ powder and the $Y_2O_3$ powder.

EXAMPLE 1-4

A monosilicate sintered body represented by $Y_2SiO_5$ was obtained as in Example 1-1, except that the raw material powder contained 0.3 mol % of a Si powder having an average particle diameter of 5.0 μm, 0.7 mol % of a $SiO_2$ powder having an average particle diameter of 0.8 μm, 1.0 mol % of $Y_2O_3$ powder having an average particle diameter of 1.3 μm, and an $Al_2O_3$ powder having an average particle diameter of 0.3 μm. The amount of the $Al_2O_3$ powder was 3% by weight based on the sum of the Si powder, the $SiO_2$ powder and the $Y_2O_3$ powder.

EXAMPLE 1-5

A monosilicate sintered body represented by $Y_2SiO_5$ was obtained as in Example 1-1, except that the raw material powder contained 0.1 mol % of a Si powder having an average particle diameter of 5.0 μm, 0.9 mol % of a $SiO_2$ powder having an average particle diameter of 0.8 μm, 1.0 mol % of $Y_2O_3$ powder having an average particle diameter of 1.3 pm, and an $Al_2O_3$ powder having an average particle diameter of 0.3 μm. The amount of the $Al_2O_3$ powder was 3% by weight based on the sum of the Si powder, the $SiO_2$ powder and the $Y_2O_3$ powder.

The micro-structure of the monosilicate sintered bodies obtained in Examples 1-1 to 1-5 was observed with a microscope. Each of these sintered bodies was found to consist of monosilicate crystal grains as shown in FIG. 1 referred to previously. It has been found that Al was segregated at the boundaries between these crystal grains in an amount of 3% by weight of the sintered body in terms of the oxide of Al.

The size of the monosilicate grain in each of the monosilicate sintered bodies obtained in Examples 1-1 to 1-5 was measured by means of a microscopic observation. Also, the size of each of the sintered bodies was measured by a micrometer so as to obtain a change in size relative to the molding. Further, a test piece was prepared from each of the sintered bodies in accordance with the method specified in JIS-1601 so as to measure the mechanical strength of the test piece at room temperature and at 1,500° C. Table 1 shows the results.

TABLE 1

|  | Si (mol %) | $SiO_2$ (mol %) | $Y_2O_3$ (mol %) | $Si/SiO_2$ | average diameter of crystals (μm) | change in size* (%) | mechanical strength at room temperature (MPa) | mechanical strength at 1500° C. (MPa) |
|---|---|---|---|---|---|---|---|---|
| Example 1-1 | 0.9 | 0.1 | 1.0 | 9.0 | 5 | −4 | 430 | 440 |
| Example 1-2 | 0.8 | 0.2 | 1.0 | 4.0 | 7 | +1 | 420 | 425 |
| Example 1-3 | 0.7 | 0.3 | 1.0 | 2.3 | 3 | −3 | 440 | 445 |
| Example 1-4 | 0.3 | 0.7 | 1.0 | 0.4 | 9 | −8 | 410 | 430 |
| Example 1-5 | 0.1 | 0.9 | 1.0 | 0.1 | 7 | −10 | 440 | 445 |

*; "−" and "+" in the column of "change in size" represent "shrinkage" and "expansion", respectively.

In Examples 1-1 to 1-5, the Si powder included in the raw material powder is converted into $SiO_2$ in the reaction-sintering process. Also, an $Al_2O_3$ powder having an average particle diameter smaller than 1.0 μm is added in an amount falling within a range of between 0.1 and 15% by weight based on the sum of the Si powder, the $SiO_2$ powder and the $Y_2O_3$ powder. As a result, obtained was a monosilicate sintered body having a change in size smaller than 10% of the molding and exhibiting a high mechanical strength under temperatures ranging between room temperature and 1,500° C., as apparent from Table 1.

EXAMPLE 2-1

In the first step, prepared was a raw material powder containing 1.7 mol % of a Y powder having an average particle diameter of 20 μm, 0.15 mol % of a $Y_2O_3$ powder having an average particle diameter of 1.3 μm, 1.0 mol % of $SiO_2$ powder having an average particle diameter of 0.8 μm, and an $Al_2O_3$ powder having an average particle diameter of 0.3 μm. The amount of the $Al_2O_3$ powder was 3% by weight based on the sum of the Y powder, the $Y_2O_3$ powder and the $SiO_2$ powder. The raw material powder was mixed using nylon balls in the presence of acetone used as a dispersion medium, followed by drying the mixture using a rotary evaporator so as to prepare a mixed powder. Then, the mixed powder was subjected to a cold press molding under a pressure of 200 MPa so as to obtain a molding. Further, the molding was left to stand within an annular furnace at 1600° C. for 2 hours under the air atmosphere so as to obtain a monosilicate sintered body represented by $Y_2siO_5$.

EXAMPLE 2-2

A monosilicate sintered body represented by $Y_2siO_5$ was obtained as in Example 2-1, except that the raw material powder contained 1.4 mol % of a Y powder having an average particle diameter of 20 μm, 0.3 mol % of a $Y_2O_3$ powder having an average particle diameter of 1.3 μm, 1.0 mol % of $SiO_2$ powder having an average particle diameter of 0.8 μm, and an $Al_2O_3$ powder having an average particle diameter of 0.3 μm. The amount of the $Al_2O_3$ powder was 3% by weight based on the sum of the Y powder, the $Y_2O_3$ powder and the $SiO_2$ powder.

EXAMPLE 2-3

A monosilicate sintered body represented by $Y_2siO_5$ was obtained as in Example 2-1, except that the raw material powder contained 1.0 mol % of a Y powder having an average particle diameter of 20 μm, 0.5 mol % of a $Y_2O_3$ powder having an average particle diameter of 1.3 μm, 1.0 mol % of $SiO_2$ powder having an average particle diameter of 0.8 μm, and an $Al_2O_3$ powder having an average particle diameter of 0.3 μm. The amount of the $Al_2O_3$ powder was 3% by weight based on the sum of the Y powder, the $Y_2O_3$ powder and the $SiO_2$ powder.

EXAMPLE 2-4

A monosilicate sintered body represented by $Y_2siO_5$ was obtained as in Example 2-1, except that the raw material powder contained 0.4 mol % of a Y powder having an average particle diameter of 20 μm, 0.8 mol % of a $Y_2O_3$ powder having an average particle diameter of 1.3 μm, 1.0 mol % of $SiO_2$ powder having an average particle diameter of 0.8 μm, and an $Al_2O_3$ powder having an average particle diameter of 0.3 μm. The amount of the $Al_2O_3$ powder was 3% by weight based on the sum of the Y powder, the $Y_2O_3$ powder and the $SiO_2$ powder.

EXAMPLE 2-5

A monosilicate sintered body represented by $Y_2siO_5$ was obtained as in Example 2-1, except that the raw material powder contained 0.2 mol % of a Y powder having an average particle diameter of 20 μm, 0.9 mol % of a $Y_2O_3$ powder having an average particle diameter of 1.3 μm, 1.0 mol % of $SiO_2$ powder having an average particle diameter of 0.8 μm, and an $Al_2O_3$ powder having an average particle diameter of 0.3 μm. The amount of the $Al_2O_3$ powder was 3% by weight based on the sum of the Y powder, the $Y_2O_3$ powder and the $SiO_2$ powder.

The micro-structure of the monosilicate sintered bodies obtained in Examples 2-1 to 2-5 was observed with a microscope. Each of these sintered bodies was found to consist of monosilicate crystal grains as shown in FIG. 1 referred to previously. It has been found that Al was segregated at the boundaries between these crystal grains in an amount of 3% by weight of the sintered body in terms of the oxide of Al.

The size of the monosilicate grain in each of the monosilicate sintered bodies obtained in Examples 2-1 to 2-5 was measured by means of a microscopic observation. Also, the size of each of the sintered bodies was measured by a micrometer so as to obtain a change in size relative to the molding. Further, the mechanical strength at room temperature and at 1,500° C. of each of the sintered bodies was measured. Table 2 shows the results.

TABLE 2

| | Y (mol %) | $Y_2O_3$ (mol %) | $SiO_2$ (mol %) | $Y/Y_2O_3$ | average diameter of crystals (μm) | change in size* (%) | mechanical strength at room temperature (MPa) | mechanical strength at 1500° C. (MPa) |
|---|---|---|---|---|---|---|---|---|
| Example 2-1 | 1.7 | 0.15 | 1.0 | 11.0 | 4 | −9 | 410 | 415 |
| Example 2-2 | 1.4 | 0.30 | 1.0 | 4.7 | 5 | −3 | 420 | 435 |
| Example 2-3 | 1.0 | 0.50 | 1.0 | 2.0 | 9 | +1 | 405 | 415 |
| Example 2-4 | 04 | 0.80 | 1.0 | 0.5 | 7 | −6 | 410 | 420 |
| Example 2-5 | 0.2 | 1.00 | 1.0 | 0.2 | 3 | −10 | 430 | 430 |

*; "−" and "+" in the column of "change in size" represent "shrinkage" and "expansion", respectively.

In Examples 2-1 to 2-5, the Y powder included in the raw material powder is converted into $Y_2O_3$ in the reaction-sintering process. Also, an $Al_2O_3$ powder having an average particle diameter smaller than 1.0 μm is added in an amount falling within a range of between 0.1 and 15% by weight based on the sum of the Y powder, the $Y_2O_3$ powder and the $SiO_2$ powder. As a result, obtained was a monosilicate sintered body having a change in size smaller than 10% of the molding and exhibiting a high mechanical strength under temperatures ranging between room temperature and 1,500° C., as apparent from Table 2.

EXAMPLE 3

In the first step, prepared was a raw material powder containing 1.8 mol % of a Si powder having an average particle diameter of 5 μm, 0.2 mol % of a $SiO_2$ powder having an average particle diameter of 0.8 μm, 1.0 mol % of $Y_2O_3$ powder having an average particle diameter of 1.3 μm, and an $Al_2O_3$ powder having an average particle diameter of 0.3 µm. The amount of the $Al_2O_3$ powder was 3% by weight based on the sum of the Si powder, the $SiO_2$ powder and the $Y_2O_3$ powder. The raw material powder was mixed using nylon balls in the presence of acetone used as a dispersion medium, followed by drying the mixture using a rotary evaporator so as to prepare a mixed powder. Then, the mixed powder was subjected to a cold press molding under a pressure of 200 MPa so as to obtain a molding. Further, the molding was left to stand within an annular furnace at 1,600° C. for 2 hours under the air atmosphere so as to obtain a disilicate sintered body represented by $Y_2Si_2O_7$.

The size of the disilicate crystal grains of the disilicate sintered body obtained in Example 3 was measured by means of a microscopic observation. Also, the size of the sintered body was measured by a micrometer so as to determine a change in size relative to the molding. Further, the mechanical strength of the sintered body at room temperature and at 1,500° C. was measured.

The size of the disilicate crystal grain was found to be 7 µm, the change in size of the sintered body relative to the molding was found to be −6%, and the mechanical strength of the sintered body at room temperature and at 1,500° C. was found to be 450 MPa and 480 MPa, respectively.

EXAMPLES 4-1 to 4-10

In the first step, prepared was a raw material powder containing 0.8 mol % of a Si powder having an average particle diameter of 5.0 µm, 0.2 mol % of a $SiO_2$ powder having an average particle diameter of 0.8 µm, 1.0 mol % of $Y_2O_3$ powder having an average particle diameter of 1.3 µm, and an oxide powder of an additional element M selected from the group consisting of Al, Cr, Hf, Nb, Zr, Ti, V, Ta, Ca and Mg, said oxide powder of the additional element M having an average particle diameter of 0.3 µm, as shown in Table 3. The amount of the oxide powder of the additional element M was 3% by weight based on the sum of the Si powder, the $SiO_2$ powder and the $Y_2O_3$ powder. The raw material powder was mixed using nylon balls in the presence of acetone used as a dispersion medium, followed by drying the mixture using a rotary evaporator so as to prepare a mixed powder. Then, the mixed powder was subjected to a cold press molding under a pressure of 200 MPa so as to obtain a molding. Further, the molding was left to stand within an annular furnace at 1,600° C. for 2 hours under the air atmosphere so as to obtain 10 kinds of a monosilicate sintered body represented by $Y_2SiO_5$.

EXAMPLES 5-1 to 5-10

In the first step, prepared was a raw material powder containing 0.8 mol % of a Si powder having an average particle diameter of 5.0 µm, 0.2 mol % of a $SiO_2$ powder having an average particle diameter of 0.8 µm, 1.0 mol % of $Sc_2O_3$ powder having an average particle diameter of 1.3 µm, and an oxide powder of an additional element M selected from the group consisting of Al, Cr, Hf, Nb, Zr, Ti, V, Ta, Ca and Mg, said oxide powder of the additional element M having an average particle diameter of 0.3 µm, as shown in Table 3. The amount of the oxide powder of the additional element M was 3% by weight based on the sum of the Si powder, the $SiO_2$ powder and the $Sc_2O_3$ powder. The raw material powder was mixed using nylon balls in the presence of acetone used as a dispersion medium, followed by drying the mixture using a rotary evaporator so as to prepare a mixed powder. Then, the mixed powder was subjected to a cold press molding under a pressure of 200 MPa so as to obtain a molding. Further, the molding was left to stand within an annular furnace at 1,600° C. for 2 hours under the air atmosphere so as to obtain 10 kinds of a monosilicate sintered body represented by $Sc_2SiO_5$.

EXAMPLES 6-1 to 6-10

In the first step, prepared was a raw material powder containing 0.8 mol % of a Si powder having an average particle diameter of 5.0 µm, 0.2 mol % of a $SiO_2$ powder having an average particle diameter of 0.8 µm, 1.0 mol % of $Dy_2O_3$ powder having an average particle diameter of 1.3 µm, and an oxide powder of an additional element M selected from the group consisting of Al, Cr, Hf, Nb, Zr, Ti, V, Ta, Ca and Mg, said oxide powder of the additional element M having an average particle diameter of 0.3 µm, as shown in Table 4. The amount of the oxide powder of the additional element M was 3% by weight based on the sum of the Si powder, the $SiO_2$ powder and the $Dy_2O_3$ powder. The raw material powder was mixed using nylon balls in the presence of acetone used as a dispersion medium, followed by drying the mixture using a rotary evaporator so as to prepare a mixed powder. Then, the mixed powder was subjected to a cold press molding under a pressure of 200 MPa so as to obtain a molding. Further, the molding was left to stand within an annular furnace at 1,600° C. for 2 hours under the air atmosphere so as to obtain 10 kinds of a monosilicate sintered body represented by $Dy_2SiO_5$.

EXAMPLES 7-1 to 7-10

In the first step, prepared was a raw material powder containing 0.8 mol % of a Si powder having an average particle diameter of 5.0 µm, 0.2 mol % of a $SiO_2$ powder having an average particle diameter of 0.8 µm, 1.0 mol % of $Er_2O_3$ powder having an average particle diameter of 1.3 µm, and an oxide powder of an additional element M selected from the group consisting of Al, Cr, Hf, Nb, Zr, Ti, V, Ta, Ca and Mg, said oxide powder of the additional element M having an average particle diameter of 0.3 µm, as shown in Table 4. The amount of the oxide powder of the additional element M was 3% by weight based on the sum of the Si powder, the $SiO_2$ powder and the $Er_2O_3$ powder. The raw material powder was mixed using nylon balls in the presence of acetone used as a dispersion medium, followed by drying the mixture using a rotary evaporator so as to prepare a mixed powder. Then, the mixed powder was subjected to a cold press molding under a pressure of 200 MPa so as to obtain a molding. Further, the molding was left to stand within an annular furnace at 1,600° C. for 2 hours under the air atmosphere so as to obtain 10 kinds of a monosilicate sintered body represented by $Er_2SiO_5$.

EXAMPLES 8-1 to 8-10

In the first step, prepared was a raw material powder containing 0.8 mol % of a Si powder having an average particle diameter of 5.0 µm, 0.2 mol % of a $SiO_2$ powder having an average particle diameter of 0.8 µm, 1.0 mol % of $Ho_2O_3$ powder having an average particle diameter of 1.3 µm, and an oxide powder of an additional element M selected from the group consisting of Al, Cr, Hf, Nb, Zr, Ti, V, Ta, Ca and Mg, said oxide powder of the additional element M having an average particle diameter of 0.3 µm, as shown in Table 5. The amount of the oxide powder of the additional element M was 3% by weight based on the sum of the Si powder, the $SiO_2$ powder and the $Ho_2O_3$ powder. The raw material powder was mixed using nylon balls in the presence of acetone used as a dispersion medium, followed by drying the mixture using a rotary evaporator so as to prepare a mixed powder. Then, the mixed powder was subjected to a cold press molding under a pressure of 200 MPa so as to obtain a molding. Further, the molding was left to stand within an annular furnace at 1,600° C. for 2 hours under the air atmosphere so as to obtain 10 kinds of a monosilicate sintered body represented by $Ho_2SiO_5$.

EXAMPLE 9-1 to 9-10

In the first step, prepared was a raw material powder containing 0.8 mol % of a Si powder having an average particle diameter of 5.0 μm, 0.2 mol % of a $SiO_2$ powder having an average particle diameter of 0.8 μm, 1.0 mol % of $Yb_2O_3$ powder having an average particle diameter of 1.3 μm, and an oxide powder of an additional element M selected from the group consisting of Al, Cr, Hf, Nb, Zr, Ti, V, Ta, Ca and Mg, said oxide powder of the additional element M having an average particle diameter of 0.3 μm, as shown in Table 5. The amount of the oxide powder of the additional element M was 3% by weight based on the sum of the Si powder, the $SiO_2$ powder and the $Yb_2O_3$ powder. The raw material powder was mixed using nylon balls in the presence of acetone used as a dispersion medium, followed by drying the mixture using a rotary evaporator so as to prepare a mixed powder. Then, the mixed powder was subjected to a cold press molding under a pressure of 200 MPa so as to obtain a molding. Further, the molding was left to stand within an annular furnace at 1,600° C. for 2 hours under the air atmosphere so as to obtain 10 kinds of a monosilicate sintered body represented by $Yb_2SiO_5$.

EXAMPLES 10-1 to 10-10

In the first step, prepared was a raw material powder containing 0.8 mol % of a Si powder having an average particle diameter of 5.0 μm, 0.2 mol % of a $SiO_2$ powder having an average particle diameter of 0.8 μm, 1.0 mol % of $Lu_2O_3$ powder having an average particle diameter of 1.3 μm, and an oxide powder of an additional element M selected from the group consisting of Al, Cr, Hf, Nb, Zr, Ti, V, Ta, Ca and Mg, said oxide powder of the additional element M having an average particle diameter of 0.3 μm. The amount of the oxide powder of the additional element M was 3% by weight based on the sum of the Si powder, the $SiO_2$ powder and the $Lu_2O_3$ powder. The raw material powder was mixed using nylon balls in the presence of acetone used as a dispersion medium, followed by drying the mixture using a rotary evaporator so as to prepare a mixed powder. Then, the mixed powder was subjected to a cold press molding under a pressure of 200 MPa so as to obtain a molding. Further, the molding was left to stand within an annular furnace at 1,600° C. for 2 hours under the air atmosphere so as to obtain 10 kinds of a monosilicate sintered body represented by $Lu_2SiO_5$.

EXAMPLES 11-1 to 11-10

In the first step, prepared was a raw material powder containing 0.8 mol % of a Si powder having an average particle diameter of 5.0 μm, 0.2 mol % of a $SiO_2$ powder having an average particle diameter of 0.8 μm, 1.0 mol % of $La_2O_3$ powder having an average particle diameter of 1.3 μm, and an oxide powder of an additional element M selected from the group consisting of Al, Cr, Hf, Nb, Zr, Ti, V, Ta, Ca and Mg, said oxide powder of the additional element M having an average particle diameter of 0.3 μm, as shown in Table 6. The amount of the oxide powder of the additional element M was 3% by weight based on the sum of the Si powder, the $SiO_2$ powder and the $La_2O_3$ powder. The raw material powder was mixed using nylon balls in the presence of acetone used as a dispersion medium, followed by drying the mixture using a rotary evaporator so as to prepare a mixed powder. Then, the mixed powder was subjected to a cold press molding under a pressure of 200 MPa so as to obtain a molding. Further, the molding was left to stand within an annular furnace at 1,600° C. for 2 hours under the air atmosphere so as to obtain 10 kinds of a monosilicate sintered body represented by $La_2SiO_5$.

EXAMPLES 12-1 to 12-10

In the first step, prepared was a raw material powder containing 0.8 mol % of a Si powder having an average particle diameter of 5.0 μm, 0.2 mol % of a $SiO_2$ powder having an average particle diameter of 0.8 μm, 1.0 mol % of $Sm_2O_3$ powder having an average particle diameter of 1.3 μm, and an oxide powder of an additional element M selected from the group consisting of Al, Cr, Hf, Nb, Zr, Ti, V, Ta, Ca and Mg, said oxide powder of the additional element M having an average particle diameter of 0.3 μm, as shown in Table 7. The amount of the oxide powder of the additional element M was 3% by weight based on the sum of the Si powder, the $SiO_2$ powder and the $Sm_2O_3$ powder. The raw material powder was mixed using nylon balls in the presence of acetone used as a dispersion medium, followed by drying the mixture using a rotary evaporator so as to prepare a mixed powder. Then, the mixed powder was subjected to a cold press molding under a pressure of 200 MPa so as to obtain a molding. Further, the molding was left to stand within an annular furnace at 1,600° C. for 2 hours under the air atmosphere so as to obtain 10 kinds of a monosilicate sintered body represented by $Sm_2SiO_5$.

EXAMPLES 13-1 to 13-10

In the first step, prepared was a raw material powder containing 0.8 mol % of a Si powder having an average particle diameter of 5.0 μm, 0.2 mol % of a $SiO_2$ powder having an average particle diameter of 0.8 μm, 1.0 mol % of $Gd_2O_3$ powder having an average particle diameter of 1.3 μm, and an oxide powder of an additional element M selected from the group consisting of Al, Cr, Hf, Nb, Zr, Ti, V, Ta, Ca and Mg, said oxide powder of the additional element M having an average particle diameter of 0.3 μm, as shown in Table 6. The amount of the oxide powder of the additional element M was 3% by weight based on the sum of the Si powder, the $SiO_2$ powder and the $Gd_2O_3$ powder. The raw material powder was mixed using nylon balls in the presence of acetone used as a dispersion medium, followed by drying the mixture using a rotary evaporator so as to prepare a mixed powder. Then, the mixed powder was subjected to a cold press molding under a pressure of 200 MPa so as to obtain a molding. Further, the molding was left to stand within an annular furnace at 1,600° C. for 2 hours under the air atmosphere so as to obtain 10 kinds of a monosilicate sintered body represented by $Gd_2SiO_5$.

The micro-structure of the monosilicate sintered body obtained in each of Examples 4-1 to 4-10, 5-1 to 5-10, 6-1 to 6-10, 7-1 to 7-10, 8-1 to 8-10, 9-1 to 9-10, 10-1 to 10-10, 11-1 to 11-10, 12-1 to 12-10 and 13-1 to 13-10 was observed with a microscope, finding that the micro-structure was similar to that shown in FIG. 1.

COMPARATIVE EXAMPLE 1

A raw material powder consisting of 1.0 mol % of a $SiO_2$ powder having an average particle diameter of 0.8 μm and 1.0 mol % of a $Y_2O_3$ powder having an average particle diameter of 1.3 μm was mixed with nylon balls using acetone as a dispersing medium, followed by drying the mixture using a rotary evaporator so as to prepare a mixed powder. The resultant mixed powder was subjected to a cold press molding under a pressure of 200 MPa so as to obtain a molding. Then, the molding was left to stand within an annular furnace set at 1,600° C. for 2 hours under the air atmosphere so as to obtain a monosilicate sintered body represented by $Y_2SiO_5$.

Figure 2:
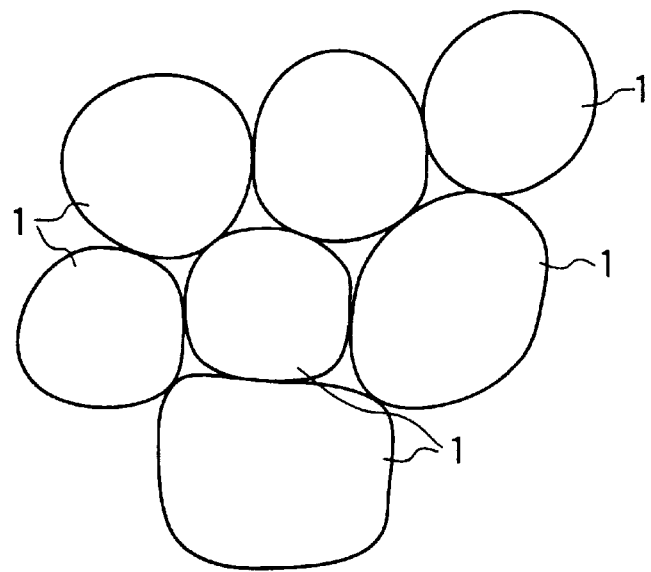
FIG. 2 schematically shows the fine structure of a ceramic sintered body obtained in Comparative Example 1, which is observed with a microscope.

The fine structure of the monosilicate sintered body obtained in Comparative Example 1 was observed with a microscope, finding that the monosilicate sintered body consisted of monosilicate crystal grains 1 alone, as shown FIG. 2. In other words, segregated substance was hardly recognized at the boundaries between the crystal grains 1.

COMPARATIVE EXAMPLE 2

A raw material powder consisting of 1.0 mol % of a $SiO_2$ powder having an average particle diameter of 0.8 μm, 1.0 mol % of a $Y_2O_3$ powder having an average particle diameter of 1.3 μm, and an $Al_2O_3$ powder having an average particle diameter of 0.3 μm was mixed with nylon balls using acetone as a dispersing medium, followed by drying the mixture using a rotary evaporator so as to prepare a mixed powder. The $Al_2O_3$ powder was added in an amount of 18% by weight of the sum of the Si powder, the $SiO_2$ powder and the $Y_2O_3$ powder. The resultant mixed powder was subjected to a cold press molding under a pressure of 200 MPa so as to obtain a molding. Then, the molding was left to stand within an annular furnace set at 1,600° C. for 2 hours under the air atmosphere so as to obtain a monosilicate sintered body represented by $Y_2SiO_5$.

Figure 3:
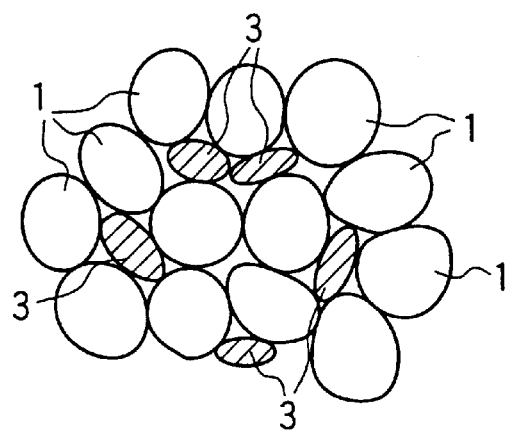
FIG. 3 schematically shows the fine structure of a ceramic sintered body obtained in Comparative Examples 2 and 3, which is observed with a microscope.

The fine structure of the monosilicate sintered body obtained in Comparative Example 2 was observed with a microscope, finding that the monosilicate sintered body exhibited a mixed texture consisting of monosilicate crystal grains 1 and $Y_2Al_2O_6$ crystal grains 6, as shown FIG. 3.

COMPARATIVE EXAMPLE 3

A raw material powder consisting of 1.0 mol % of a $SiO_2$ powder having an average particle diameter of 0.8 μm, 1.0 mol % of a $Y_2O_3$ powder having an average particle diameter of 1.3 μm, and an $Al_2O_3$ powder having an average particle diameter of 2.0 μm was mixed with nylon balls using acetone as a dispersing medium, followed by drying the mixture using a rotary evaporator so as to prepare a mixed powder. The $Al_2O_3$ powder was added in an amount of 18% by weight of the sum of the Si powder, the $SiO_2$ powder and the $Y_2O_3$ powder. The resultant mixed powder was subjected to a cold press molding under a pressure of 200 MPa so as to obtain a molding. Then, the molding was left to stand within an annular furnace set at 1,600° C. for 2 hours under the air atmosphere so as to obtain a monosilicate sintered body represented by $Y_2SiO_5$.

The fine structure of the monosilicate sintered body obtained in Comparative Example 2 was observed with a microscope, finding that the monosilicate sintered body exhibited a mixed texture consisting of monosilicate crystal grains 1 and $Y_2Al_2O_6$ crystal grains 6, as shown FIG. 3.

The size of the monosilicate crystal grain was measures by means of a microscopic observation in respect of each of the monosilicate sintered bodies obtained in Examples 4-1 to 4-10, 5-1 to 5-10, 6-1 to 6-10, 7-1 to 7-10, 8-1 to 8-10, 9-1 to 9-10, 10-1 to 10-10, 11-1 to 11-10, 12-1 to 12-10, 13-1 to 13-10 and Comparative Examples 1 to 3. Also, a test piece was prepared from each of the sintered bodies in accordance with the method specified in JIS-1601 so as to measure the mechanical strength of the test piece at room temperature and at 1,500° C. The results are shown in Tables 3 to 7.

TABLE 4

|  | kind of RE | kind of M | average grain diameter of crystals (μm) | mechanical strength at room temperature (MPa) | mechanical strength at 1500° C. (MPa) |
|---|---|---|---|---|---|
| Example 6-1 | Dy | Al | 3 | 435 | 440 |
| Example 6-2 | Dy | Cr | 4 | 450 | 445 |
| Example 6-3 | Dy | Hf | 6 | 445 | 440 |
| Example 6-4 | Dy | Nb | 3 | 440 | 435 |
| Example 6-5 | Dy | Zr | 5 | 445 | 440 |
| Example 6-6 | Dy | Ti | 4 | 430 | 420 |
| Example 6-7 | Dy | V | 7 | 430 | 415 |
| Example 6-8 | Dy | Ta | 4 | 440 | 430 |
| Example 6-9 | Dy | Ca | 5 | 420 | 400 |
| Example 6-10 | Dy | Mg | 4 | 420 | 405 |
| Example 7-1 | Er | Al | 6 | 435 | 440 |
| Example 7-2 | Er | Cr | 5 | 450 | 445 |
| Example 7-3 | Er | Hf | 3 | 445 | 440 |
| Example 7-4 | Er | Nb | 4 | 440 | 435 |
| Example 7-5 | Er | Zr | 8 | 445 | 440 |
| Example 7-6 | Er | Ti | 5 | 430 | 420 |
| Example 7-7 | Er | V | 4 | 430 | 415 |
| Example 7-8 | Er | Ta | 7 | 440 | 430 |
| Example 7-9 | Er | Ca | 4 | 420 | 400 |
| Example 7-10 | Er | Mg | 5 | 420 | 405 |

TABLE 3

|  | kind of RE | kind of M | average grain diameter of crystals (μm) | mechanical strength at room temperature (MPa) | mechanical strength at 1500° C. (MPa) |
|---|---|---|---|---|---|
| Example 4-1 | Y | Al | 5 | 435 | 440 |
| Example 4-2 | Y | Cr | 4 | 450 | 445 |
| Example 4-3 | Y | Hf | 7 | 440 | 440 |
| Example 4-4 | Y | Nb | 4 | 435 | 435 |
| Example 4-5 | Y | Zr | 5 | 440 | 440 |
| Example 4-6 | Y | Ti | 4 | 420 | 420 |
| Example 4-7 | Y | V | 6 | 415 | 415 |
| Example 4-8 | Y | Ta | 5 | 430 | 430 |
| Example 4-9 | Y | Ca | 3 | 400 | 400 |
| Example 4-10 | Y | Mg | 4 | 405 | 405 |
| Example 5-1 | Sc | Al | 6 | 420 | 410 |
| Example 5-2 | Sc | Cr | 5 | 440 | 425 |
| Example 5-3 | Sc | Hf | 5 | 415 | 420 |
| Example 5-4 | Sc | Nb | 4 | 435 | 440 |
| Example 5-5 | Sc | Zr | 7 | 430 | 420 |
| Example 5-6 | Sc | Ti | 4 | 440 | 410 |
| Example 5-7 | Sc | V | 5 | 455 | 415 |
| Example 5-8 | Sc | Ta | 4 | 425 | 420 |
| Example 5-9 | Sc | Ca | 6 | 415 | 410 |
| Example 5-10 | Sc | Mg | 5 | 405 | 405 |

TABLE 5

|  | kind of RE | kind of M | average grain diameter of crystals (μm) | mechanical strength at room temperature (MPa) | mechanical strength at 1500° C. (MPa) |
|---|---|---|---|---|---|
| Example 8-1 | Ho | Al | 4 | 435 | 420 |
| Example 8-2 | Ho | Cr | 6 | 425 | 400 |
| Example 8-3 | Ho | Hf | 5 | 440 | 405 |
| Example 8-4 | Ho | Nb | 3 | 455 | 420 |
| Example 8-5 | Ho | Zr | 4 | 450 | 415 |

TABLE 5-continued

|  | kind of RE | kind of M | average grain diameter of crystals (μm) | mechanical strength at room temperature (MPa) | mechanical strength at 1500° C. (MPa) |
|---|---|---|---|---|---|
| Example 8-6 | Ho | Ti | 5 | 425 | 400 |
| Example 8-7 | Ho | V | 4 | 415 | 410 |
| Example 8-8 | Ho | Ta | 7 | 425 | 420 |
| Example 8-9 | Ho | Ca | 4 | 440 | 420 |
| Example 8-10 | Ho | Mg | 5 | 450 | 420 |
| Example 9-1 | Yb | Al | 4 | 435 | 440 |
| Example 9-2 | Yb | Cr | 6 | 450 | 445 |
| Example 9-3 | Yb | Hf | 5 | 445 | 440 |
| Example 9-4 | Yb | Nb | 3 | 440 | 435 |
| Example 9-5 | Yb | Zr | 4 | 445 | 440 |
| Example 9-6 | Yb | Ti | 5 | 430 | 420 |
| Example 9-7 | Yb | V | 7 | 430 | 415 |
| Example 9-8 | Yb | Ta | 4 | 440 | 430 |
| Example 9-9 | Yb | Ca | 8 | 420 | 400 |
| Example 9-10 | Yb | Mg | 5 | 420 | 405 |

TABLE 6

|  | kind of RE | kind of M | average grain diameter of crystals (μm) | mechanical strength at room temperature (MPa) | mechanical strength at 1500° C. (MPa) |
|---|---|---|---|---|---|
| Example 10-1 | Lu | Al | 4 | 440 | 425 |
| Example 10-2 | Lu | Cr | 7 | 420 | 420 |
| Example 10-3 | Lu | Hf | 4 | 430 | 425 |
| Example 10-4 | Lu | Nb | 5 | 435 | 415 |
| Example 10-5 | Lu | Zr | 4 | 425 | 405 |
| Example 10-6 | Lu | Ti | 6 | 435 | 415 |
| Example 10-7 | Lu | V | 5 | 430 | 410 |
| Example 10-8 | Lu | Ta | 3 | 415 | 400 |
| Example 10-9 | Lu | Ca | 4 | 410 | 415 |
| Example 10-10 | Lu | Mg | 5 | 420 | 405 |
| Example 11-1 | La | Al | 7 | 420 | 410 |
| Example 11-2 | La | Cr | 3 | 440 | 425 |
| Example 11-3 | La | Hf | 5 | 415 | 420 |
| Example 11-4 | La | Nb | 4 | 435 | 440 |
| Example 11-5 | La | Zr | 7 | 430 | 415 |
| Example 11-6 | La | Ti | 4 | 440 | 410 |
| Example 11-7 | La | V | 5 | 455 | 415 |
| Example 11-8 | La | Ta | 4 | 425 | 420 |
| Example 11-9 | La | Ca | 6 | 415 | 410 |
| Example 11-10 | La | Mg | 5 | 420 | 405 |

TABLE 7

|  | kind of RE | kind of M | average grain diameter of crystals (μm) | mechanical strength at room temperature (MPa) | mechanical strength at 1500° C. (MPa) |
|---|---|---|---|---|---|
| Example 12-1 | Sm | Al | 3 | 420 | 410 |
| Example 12-2 | Sm | Cr | 4 | 430 | 425 |
| Example 12-3 | Sm | Hf | 7 | 415 | 420 |
| Example 12-4 | Sm | Nb | 5 | 435 | 410 |
| Example 12-5 | Sm | Zr | 4 | 425 | 420 |
| Example 12-6 | Sm | Ti | 7 | 420 | 410 |
| Example 12-7 | Sm | V | 4 | 455 | 405 |
| Example 12-8 | Sm | Ta | 5 | 425 | 420 |
| Example 12-9 | Sm | Ca | 4 | 415 | 410 |
| Example 12-10 | Sm | Mg | 6 | 420 | 405 |
| Example 13-1 | Gd | Al | 5 | 435 | 440 |
| Example 13-2 | Gd | Cr | 3 | 450 | 445 |
| Example 13-3 | Gd | Hf | 4 | 445 | 440 |
| Example 13-4 | Gd | Nb | 3 | 440 | 435 |
| Example 13-5 | Gd | Zr | 7 | 445 | 440 |

TABLE 7-continued

|  | kind of RE | kind of M | average grain diameter of crystals (μm) | mechanical strength at room temperature (MPa) | mechanical strength at 1500° C. (MPa) |
|---|---|---|---|---|---|
| Example 13-6 | Gd | Ti | 5 | 430 | 420 |
| Example 13-7 | Gd | V | 8 | 430 | 415 |
| Example 13-8 | Gd | Ta | 3 | 440 | 430 |
| Example 13-9 | Gd | Ca | 5 | 420 | 400 |
| Example 13-10 | Gd | Mg | 5 | 420 | 405 |
| 1 | Y | — | 23 | 330 | 310 |
| 2 | Y | Al | 9 | 380 | 280 |
| 3 | Y | Al | 14 | 370 | 290 |

As apparent from the experimental data given in Tables 3 to 7, the bending strength at room temperature is low and the deterioration of the mechanical strength at 1500° C. is 100 MPa in the largest case in Comparative Example 1, in which an assistant such as the $Al_2O_3$ powder was not added, in Comparative Example 2, in which the assistant of the $Al_2O_3$ powder was added in a large amount exceeding 15% by weight based on the sum of the other components of the raw material, and in Comparative Example 3, in which the assistant of the $Al_2O_3$ powder had a large average particle diameter exceeding 1.0 μm.

On the other hand, the monosilicate sintered body obtained in any of Examples 4-1 to 4-10, 5-1 to 5-10, 6-1 to 6-10, 7-1 to 7-10, 8-1 to 8-10, 9-1 to 9-10, 10-1 to 10-10, 11-1 to 11-10, 12-1 to 12-10, and 13-1 to 13-10 exhibited a high bending strength at room temperature of at least 420 MPa and the deterioration of the mechanical strength at 1,500° C. was as small as at most 20 MPa.

In addition, when the monosilicate sintered bodies and the disilicate sintered body obtained in all of Examples were exposed in an air atmosphere at 1500° C. for 1000 hours, a weight of each sintered bodies did not change.

As described above, the present invention provides a ceramic sintered body exhibiting an excellent oxidation resistance at high temperatures and a mechanical strength markedly higher than that of the conventional ceramic sintered body over a wide temperature range of between room temperature and 1,500° C. In addition, the shrinkage in the reaction-sintering step can be suppressed to 10% or less in the ceramic sintered body of the present invention.

The present invention also provides a method of manufacturing a ceramic sintered body excellent in oxidation resistance at high temperatures, exhibiting a mechanical strength markedly higher than that of the conventional ceramic sintered body over a wide temperature range of between room temperature and 1,500° C. In addition, the method of the present invention makes it possible to suppress the shrinkage in the reaction-sintering step to 10% or less in manufacturing the ceramic sintered body.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a ceramic sintered body, comprising the steps of:

preparing a mixed powder containing a Si powder, a powder of an oxide of a IIIa group element including yttrium, a powder of an oxide of at least one additional element selected from the group consisting of Al, Cr, Hf, Nb, Zr, Ti, V, Ta, Ca and Mg, the oxide powder of said additional element having an average particle diameter of 1.0 μm or less and being added to allow the manufactured ceramic sintered body to contain said oxide powder of the additional element in an amount of 0.1 to 15% by weight;

molding said powder mixture to prepare a molding; and sintering the molding under an oxidizing atmosphere;

wherein said ceramic sintered body comprises at least one ceramic crystal grain selected from the group consisting essentially of a monosilicate represented by the general formula $RE_2SiO_5$, where RE denotes a IIIa group element including yttrium, and a disilicate represented by the general formula $RE_2Si_2O_7$, where RE denotes a IIIa group element including yttrium, and at least one additional element selected from the group consisting of Al, Cr, Hf, Nb, Zr, Ti, V, Ta, Ca and Mg which is segregated in the boundaries of said ceramic crystal grain.

2. A method of manufacturing a ceramic sintered body according to claim 1, wherein the oxide powder of said at least one additional element has an average particle diameter of 0.01 to 0.5 μm.

3. The method of manufacturing a ceramic sintered body according to claim 1, wherein the oxide powder of said at least one additional element has an average particle diameter of 0.05 to 0.3 μm.

4. The method of manufacturing a ceramic sintered body according to claim 1, wherein said Si powder and said oxide powder of the IIIa group element have an average particle diameter of 1.0 to 50 μm and 0.1 to 50 μm, respectively.

5. The method of manufacturing a ceramic sintered body according to claim 1, wherein said mixed powder further contains a $SiO_2$ powder, a molar ratio of said Si powder to said $SiO_2$ powder, i.e., $Si/SiO_2$, being 0.1 to 20.

6. The method of manufacturing a ceramic sintered body according to claim 5, wherein said $SiO_2$ powder has an average particle diameter of 0.1 to 50 μm.

7. The method of manufacturing a ceramic sintered body according to claim 1, wherein said sintering temperature is 1,100 to 1,850° C.

8. The method of manufacturing a ceramic sintered body according to claim 1, wherein said sintering temperature is 1,200 to 1,750° C.

9. A method of manufacturing a ceramic sintered body, comprising the steps of:

preparing a mixed powder containing a IIIa group element including yttrium, a $SiO_2$ powder, and a powder of an oxide of at least one additional element selected from the group consisting of Al, Cr, Hf, Nb, Zr, Ti, V, Ta, Ca and Mg, the oxide powder of said additional element having an average particle diameter of 1.0 μm or less and being added to allow the manufactured ceramic sintered body to contain said oxide powder of the additional element in an amount of 0.1 to 15% by weight;

molding said powder mixture to prepare a molding; and sintering the molding in an oxidizing atmosphere;

wherein said ceramic sintered body comprises at least one ceramic crystal grain selected from the group consisting essentially of a monosilicate represented by the general formula $RE_2SiO_5$, where RE denotes a IIIa group element including yttrium, and a disilicate represented by the general formula $RE_2Si_2O_7$, where RE denotes a IIIa group element including yttrium, and at least one additional element selected from the group consisting of Al, Cr, Hf, Nb, Zr, Ti, V, Ta, Ca and Mg which is segregated in the boundaries of said ceramic crystal grain.

10. The method of manufacturing a ceramic sintered body according to claim 9, wherein said oxide powder of at least one additional element has an average particle diameter of 0.01 to 0.5 μm.

11. The method of manufacturing a ceramic sintered body according to claim 9, wherein said oxide powder of at least one additional element has an average particle diameter of 0.05 to 0.3 μm.

12. The method of manufacturing a ceramic sintered body according to claim 9, wherein the powder of said IIIa group element and said $SiO_2$ powder have an average particle diameter of 1.0 to 50 μm and 0.1 to 50 μm, respectively.

13. The method of manufacturing a ceramic sintered body according to claim 9, wherein said mixed powder further contains a powder of said IIIa group element including yttrium, a molar ratio of said IIIa group element including yttrium powder to said oxide powder of said IIIa group element including yttrium, i.e., IIIa group element including yttrium/oxide of IIIa group element including yttrium, being 0.1 to 15.

14. The method of manufacturing a ceramic sintered body according to claim 13, wherein said oxide powder of said IIIa group element has an average particle diameter of 0.1 to 5.0 μm.

15. The method of manufacturing a ceramic sintered body according to claim 9, wherein said sintering temperature is 1,100 to 1,850° C.

* * * * *